United States Patent
Greenwood, Jr. et al.

[11] Patent Number: 5,963,418
[45] Date of Patent: Oct. 5, 1999

[54] MULTIPLE ANODE HIGH ENERGY DENSITY ELECTROLYTIC CAPACITOR

[75] Inventors: John M. Greenwood, Jr.; Van Ness Harwood, Jr., both of Williamsville; Oakland J. Weatherup, Lockport, all of N.Y.

[73] Assignee: CM Components, Inc., Williamsville, N.Y.

[21] Appl. No.: 09/040,903

[22] Filed: Mar. 18, 1998

Related U.S. Application Data

[60] Provisional application No. 60/041,492, May 2, 1997.

[51] Int. Cl.[6] .............................. H01G 9/04; H01G 4/32; H01G 4/228
[52] U.S. Cl. .................... 361/508; 361/520; 361/509; 361/511; 361/528; 361/529; 361/530; 361/531
[58] Field of Search ..................................... 361/500, 502, 361/508–509, 511–512, 516, 517, 520, 524, 528–530, 531–533, 535, 538; 29/25.03

[56] References Cited

U.S. PATENT DOCUMENTS

| | | | |
|---|---|---|---|
| 5,146,391 | 9/1992 | MacFarland et al. | 361/525 |
| 5,153,820 | 10/1992 | MacFarland et al. | 361/525 |
| 5,584,890 | 12/1996 | Mac Farlane et al. | 29/250.3 |

*Primary Examiner*—Kristine Kincaid
*Assistant Examiner*—Anthony Dinkins
*Attorney, Agent, or Firm*—Crossetta & Associates

[57] ABSTRACT

A multiple anode capacitor (10) having offset terminal leads or strips which maximizes capacitance achieved per volume occupied by the capacitor. More specifically, the invention including a multiple anode aluminum electrolytic capacitor including a cylindrical casing (42), a header (45) crimped to the open end of the casing, the header including a primary anode terminal (41) and a primary cathode terminal (44). Disposed within the casing is a wound or coiled capacitor body (28) having plural anode foils (11, 12, 13), a capacitor foil (14), and dielectric paper separator layers (15, 16) disposed between the cathode and the anodes. In a preferred embodiment, three juxtapositioned anode foils are used, the foils being made from a high purity porous aluminum foil. In addition, each of the dielectric paper separator layers is formed of two kraft capacitor tissue papers (15a, 15b, 16a, 16b). Leads, or terminal strips, are attached to each of the anode or cathode foils, the attaching section of each of the leads being offset from the other attaching sections (21a, 22a, 23a, 24a) when the foils are wound together. The leads of the anode foils are connected to the primary anode terminal and the lead of the cathode foil is connected to the primary cathode terminal. A suitable electrolyte (47) permeates the wound capacitor body.

9 Claims, 6 Drawing Sheets

MULTIPLE ANODE HIGH ENERGY DENSITY ELECTROLYTIC CAPACITOR

This application claims benefit of U.S. Provisional Application No. 60/041,492, filed May 2, 1997, now abandoned.

TECHNICAL FIELD

The present invention relates to capacitors, more particularly to electrolytic capacitors, and still more particularly, to multiple anode high energy density electrolytic capacitors.

BACKGROUND OF THE INVENTION

A capacitor is a device used in electronic circuits to store electrical charge. Electrical charge Q, is measured in coulombs and one electron has a charge of about $1.6 \times 10^{-19}$ coulombs. Typically, the electrical charge is stored on the surfaces of plates separated by a dielectric. The plates are generally layered and may be planar or wound, as for example in a spiral roll. The charge creates an electrostatic field which exists between the plates and therefore creates a potential difference, or voltage V, to exist between the plates.

Capacitance C, is measured in farads and a farad is defined as one coulomb per volt. In general, the capacitance of a device is determined by dividing the charge stored on the plates by the voltage the charge creates across the plates. By increasing the capacitance, a greater charge can be stored per unit volt.

Generally, capacitance can be increased in two ways; by increasing the area of the plates, and by reducing the separation distance between the plates. In an electrolytic capacitor, capacitance is achieved on the anode (+) plate by electrolytically forming a thin layer of dielectric oxide on the surface and immersing it in an electrolyte solution which functions as the negative (−) plate.

The energy, in joules, stored in a capacitor equals $\frac{1}{2}CV^2$. In some applications, it is desired to maximize the energy density of a capacitor. One such application is in the biomedical arts, and especially in implantable devices such as medical defibrillators.

Defibrillators must be capable of supplying an intense burst of energy to the heart in a very short time. The battery power supply of a typical implantable defibrillator is incapable of producing this energy alone. Therefore, the battery is used to charge an electrolytic capacitor which is then used to deliver the energy to the heart. For obvious reasons, it is important to minimize the size of the capacitor which is usually the largest component in the defibrillator circuit. It is thus advantageous to use a capacitor having as high an energy density as possible. Flat capacitor configurations, although providing thinness, are complex to manufacture and do not generally provide the overall packaging density achievable in wound configurations. Machine wound configurations are generally easier to produce but are subject to packaging inefficiencies.

One example of an electrolytic capacitor intended for use in a defibrillator is disclosed in U.S. Pat. No. 5,584,890. The multiple anode capacitor disclosed in the patent achieves increased capacitance and energy density over other flat capacitor designs. The method of lead placement and welding together of anode plates however, is not applicable to wound capacitors with long anodes.

What is needed then, is a wound multiple anode capacitor which provides maximum energy density and is acceptably thin.

One object of the invention is to provide a multiple anode capacitor which provides maximum energy density.

Another object of the invention is to provide an extremely high energy density capacitor especially suited for use in implantable medical devices such as defibrillators.

These and other objects of the invention will become apparent from the following recitation of the invention.

SUMMARY OF THE INVENTION

The present invention comprises a multiple anode capacitor having offset terminal leads or strips which maximize capacitance achieved per volume occupied by the capacitor. More specifically, the invention comprises a multiple anode aluminum electrolytic capacitor comprising a cylindrical casing, a header crimped to the open end of the casing, the header including a primary anode terminal and a primary cathode terminal. Disposed within the casing is a wound or spiral coiled capacitor body having plural anode foils, a cathode foil and one or more dielectric material separator layers disposed between the cathode and the anode.

In a preferred embodiment, three juxtapositioned anode foils are used, the anode foils being made from high purity, porous aluminum foil and dielectric material separator layers being formed from one or more, preferably two, kraft capacitor tissue papers. Leads, commonly referred to as terminal strips, are attached to each of the anodes and the cathode foil, the leads comprising an attaching section which attaches to the foil and a projecting tab. Each of the attaching sections is arranged to be offset from the other attaching sections when the foils are wound together. The projecting tabs comprise the leads of the anode foils and are generally connected to the primary anode terminal. A lead of the cathode foil is generally connected to the primary cathode terminal. A suitable electrolyte permeates the wound capacitor body. The first anode foil has a first anode terminal strip affixed transversely to the first anode foil, the second anode foil has a second anode terminal strip affixed transversely to the second anode foil and is offset with respect to the first anode terminal strip. The third anode foil has a third anode terminal strip affixed transversely to the third anode foil, the third anode terminal strip being offset with respect to both the first anode terminal strip and the second anode terminal strip.

In further preferred embodiments projecting tabs of two or more anode terminal strips are offset from their respective attachment sections such that in the finished wound capacitor, the attachment sections are offset from each other, while their respective projecting tabs are in a stacked arrangement. In another embodiment, two of the anode layers are comprised of porous foil whereas the third layer is comprised of non-porous foil.

The above features and advantages of the invention will become more apparent to those having skill in the art from the following written description, drawings and appended claims.

DETAILED DESCRIPTION OF THE DRAWINGS

At the outset, it should be clearly understood that like reference numerals are intended to identify the same structural elements, portions or surfaces consistently throughout the several drawing figures as such elements, portions or surfaces may be further described or explained by the entire written specification, of which this detailed description is an integral part. Unless otherwise indicated, the drawings are intended to be read together with the specification, and are to be considered a portion of the entire written description of this invention.

It should also be appreciated that, although a three anode capacitor is illustrated in the drawings, the invention is directed to a multiple anode capacitor, and the appended claims are not intended to be limited in scope to any specific number of anodes or leads therefrom. Rather, the claims are directed to a capacitor having two or more anodes.

Figure 12:
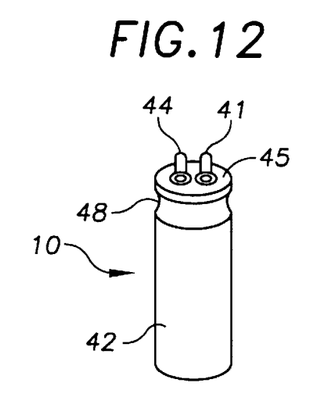
FIG. 12 illustrates an assembled capacitor in perspective.

A preferred embodiment of the capacitor of the invention is illustrated in assembled form in FIG. 12. Therein, capacitor 10 is shown in perspective as comprising a generally cylindrical casing or housing 42 having a generally non-conductive header 45 with a primary anode terminal illustrated as stud 41 and a primary cathode terminal illustrated as stud 44. In a preferred embodiment the housing is made of aluminum, preferably thin walled aluminum and most preferably about 0.010" in thickness. The individual components and assembly of the capacitor are best understood with reference to the remaining drawing figures.

Figure 7:
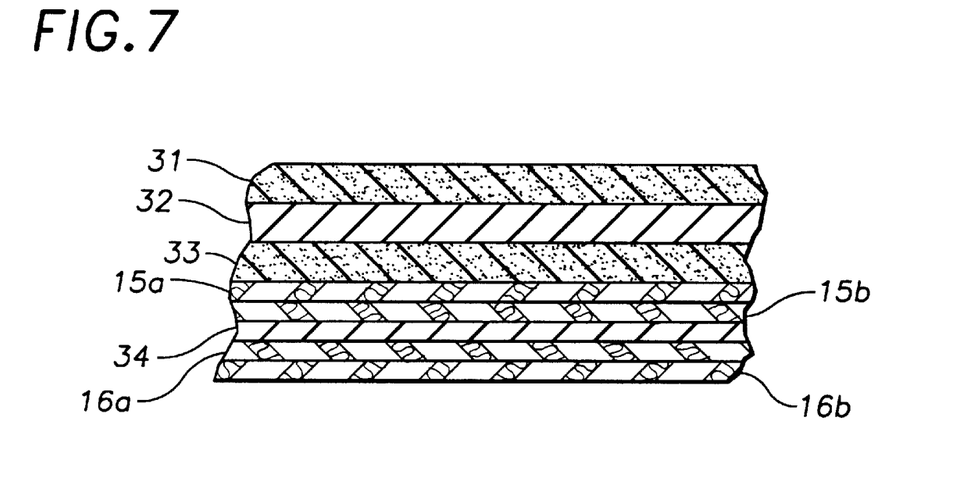
FIG. 7 is a fragmentary cross-sectional view of the capacitor shown in FIG. 6, taken generally along about line 7—7.
Figure 8:
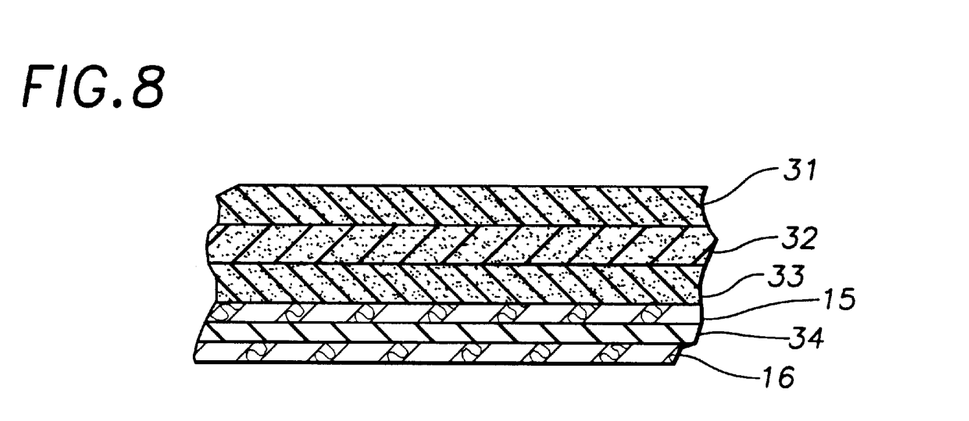
FIG. 8 is a view similar to that of FIG. 7, but a further embodiment with a single paper layer substituted for the double paper layer, and with the center anode foil being of a non-porous construction.

The anode and cathode layers of the capacitor are shown in plan view in FIGS. 1–4. The anode layers comprise roughened aluminum foil and preferably porous roughened aluminum foil having a minimum porosity, measured by air flow, of at least about 0.5 cc/sec-cm$^2$-atm and higher. The first anode foil or layer 11 comprises a strip of aluminum foil 31, preferably porous. The second anode foil or layer 12 comprises a strip of aluminum foil 32. The second anode layer is also preferably porous as shown in FIG. 7, but may also be constructed of non-porous aluminum foil as shown in FIG. 8. The third anode foil or layer 13 comprises a strip of aluminum foil 33 which is preferably porous. While the length and width of the anode layers are dependent upon the total capacitance and desired length to diameter ratio of the finished capacitor, a length of approximately 10 inches is typical.

The aluminum foil used can be of any convenient thickness, but is preferably about 0.004 mil in thickness and has a preferred forming voltage of about 420 Volts. It should be understood however, that selection of forming voltage is generally dictated by the ultimate capacitor voltage requirement. The aluminum foil used is typically of a very high purity, generally 98% or higher, and is usually manufactured especially for electrolytic capacitor use, generally with an oxide surface. The capacitance of the aluminum foil used is dependent upon the surface area of the foil. Generally, surface area of the foil is increased by using a rough finish surface on the foil such as by etching and the like. Generally, the finish surface of the foil is roughened to enable a capacitance of at least about 0.2 $\mu$F per square centimeter, preferably at least about 0.4 $\mu$F per square centimeter, and most preferred at least about 0.7 $\mu$F per square centimeter. High capacitance foil is generally preferred for defibrillator and other medical device applications. Manufacturers of capacitor aluminum foil include Becromal, Satma and ACOM (Matsushita).

Figure 4:
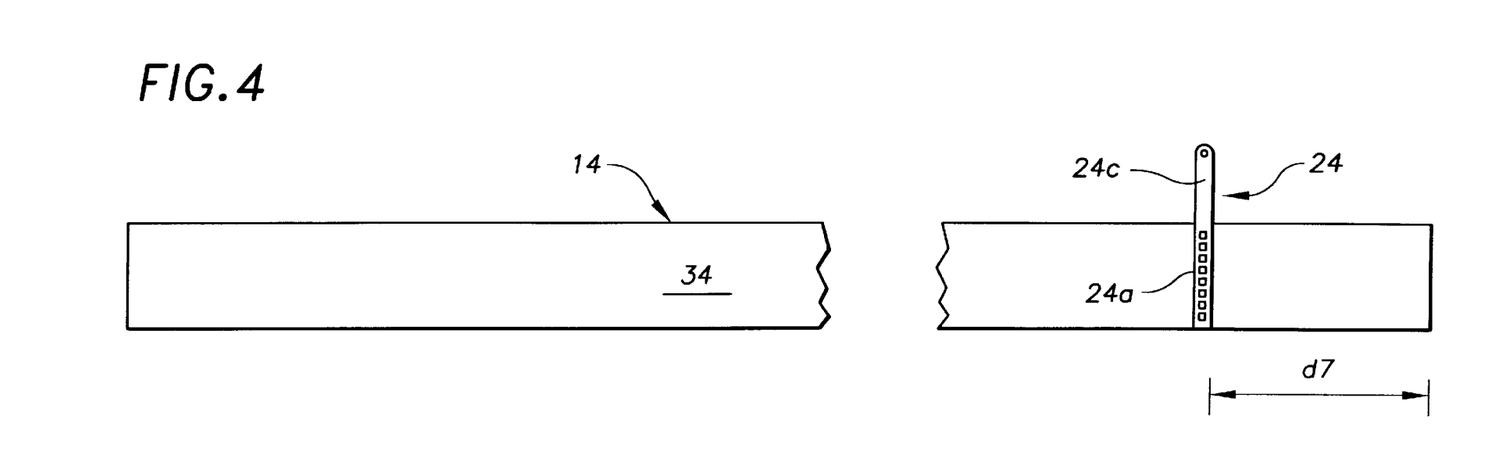
FIG. 4 is a plan view of a cathode layer of one embodiment of the invention.

The cathode foil or layer 14 is shown in plan view in FIG. 4. The cathode layer is generally longer in length than the anode layers, generally by about one winding turn on the inside of the roll and generally having enough additional length to overlap the end of the farthest anode strip on the roll. The cathode layer is typically aluminum foil having a thickness of about 0.0005 to about 0.002 mil. Capacitance of the cathode aluminum foil is typically between about 5 and about 30 $\mu$F per square centimeter. An aluminum purity of the cathode of about 98% or more is generally preferred. Both Becromal and Satma produce suitable foil for the cathode layer.

As shown in FIGS. 1–4, each anode and cathode layer has a lead or terminal strip attached thereto, with each terminal strip including an attaching section which is attached to the foil strip, and a projecting tab which may be secured to a stud or terminal 41 or 44.

Figure 1:
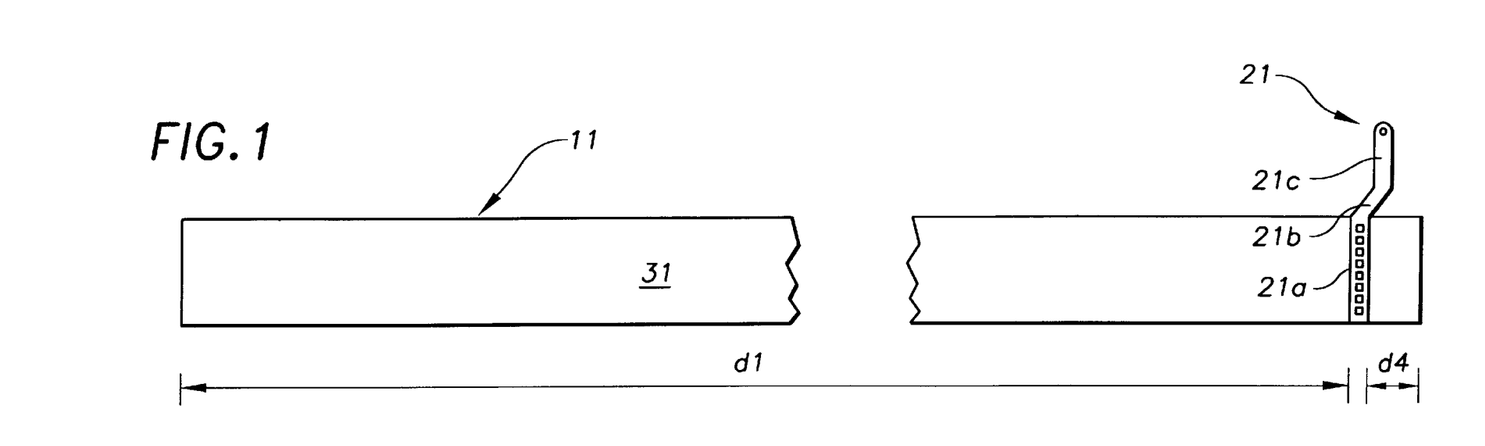
FIG. 1 is a plan view of a first anode layer of one embodiment of the invention.
Figure 2:
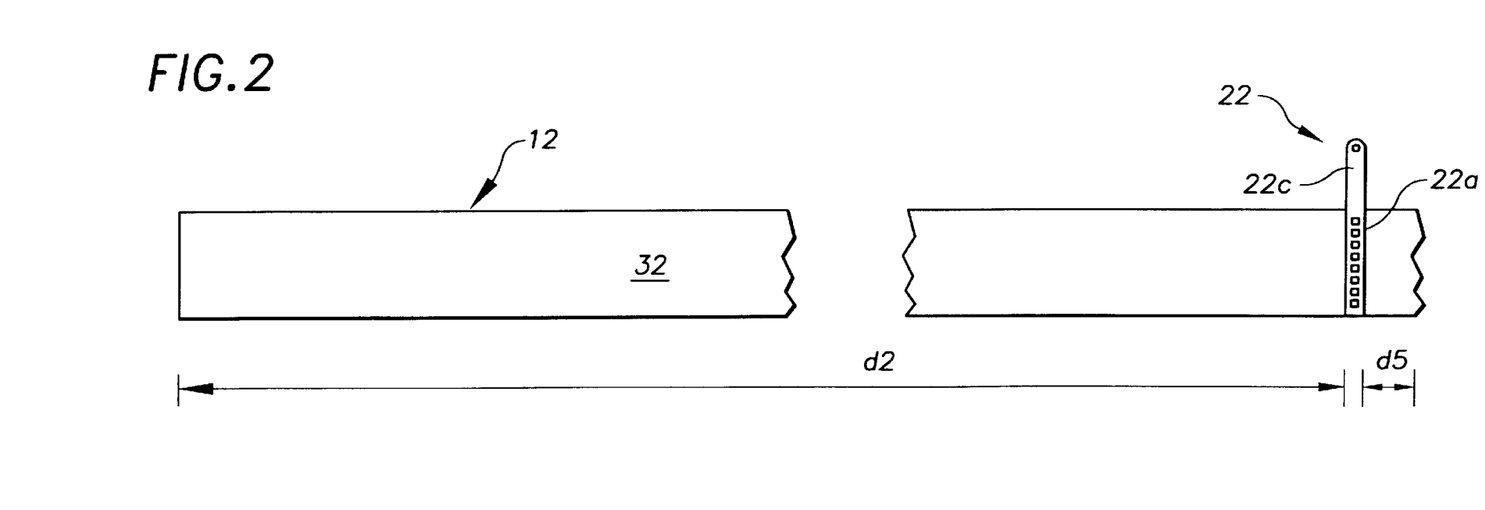
FIG. 2 is a plan view of a second anode layer of one embodiment of the invention.
Figure 3:
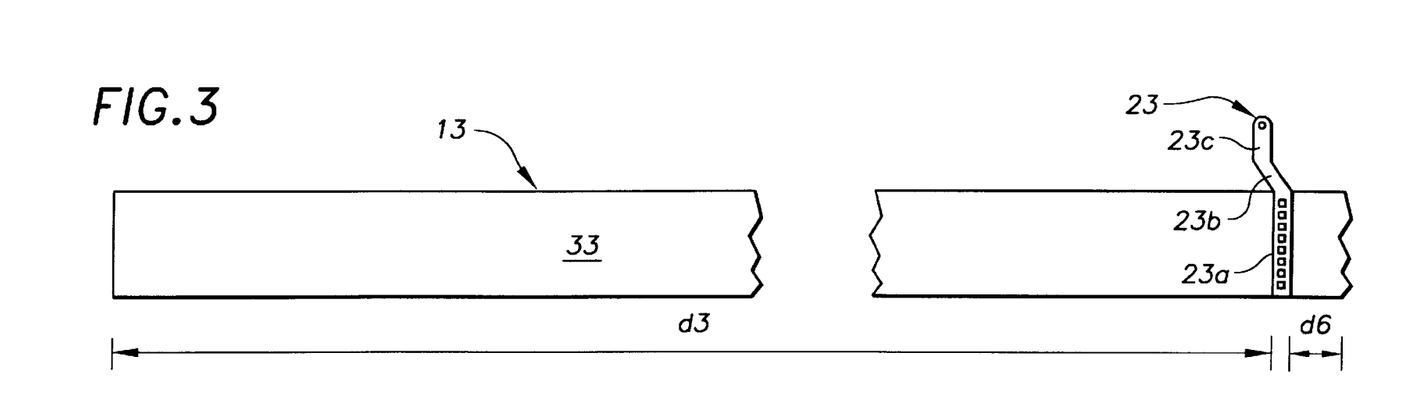
FIG. 3 is a plan view of a third anode layer of one embodiment of the invention.

In accordance with the present invention, FIGS. 1–3 illustrate three anodes 11, 12 and 13, the anodes comprising foil strips 31, 32 and 33 respectively as used in a three anode capacitor configuration. Foil strips 31, 32 and 33 are illustrated as comprising anode terminal strips 21, 22 and 23 respectively, having attaching sections 21a, 22a and 23a respectively. The attachment strips are illustrated as spaced along their respective foil strips, so as to be offset with respect to each other upon being wound to form the capacitor. Such offset of terminal strips enables the avoidance of stacking of terminal strips in the wound capacitor, and has the effect of minimizing air space between winding layers and maximizing capacitance per unit volume of the assembled capacitor.

FIG. 1, illustrates anode terminal strip 21 as comprising an attaching section 21a, which is attached transversely to aluminum foil anode 11, and a projecting tab which is illustrated as comprising an intermediate section 21b and a remote section 21c. Intermediate section 21b is shown as projecting upwardly and leftwardly at an angle from attachment section 21a. Remote section 21c is illustrated as extending upwardly from and angled to intermediate section 21b so that it is about parallel to the axis of attaching section 21a. In a preferred embodiment, intermediate section 21b is angled at about 45° to attachment section 21a and remote section 21c. Attaching section 21a is generally attached to the aluminum foil by cold welding, but any convenient attachment means such as piercing, flattening, stitching, welding or the like may be used.

In FIG. 2, anode terminal strip 22 is illustrated as comprising an attaching section 22a which is attached transversely to aluminum foil anode 12, by the same or different suitable attachment means and a projecting tab 22c is illustrated as projecting generally upward about along the same axis as attaching section 22a.

In FIG. 3, anode terminal strip 23 is illustrated as comprising attaching section 23a which is attached transversely to aluminum foil anode 13, and a projecting tab which is illustrated as comprising an intermediate section 23b and a remote section 23c. Intermediate section 23b is shown as projecting upwardly and rightwardly at an angle from attachment section 23a. Remote section 23c is illustrated as extending upwardly from and angled to intermediate section 23b so that it is about parallel to attaching section 23a. Again, in a preferred embodiment, intermediate section 23b is angled at about 45° to attachment section 23a and remote section 23c and the attaching section is attached by the same of different suitable means.

In spiral rolled windings containing a plurality of stacked layers of material, when the starting ends of the layers are arranged in common alignment each layer arranged inwardly along the radius must be shorter than the preceding outward layer to enable the ending edges of the layers to be commonly aligned at completion of the winding. Starting or ending a plurality of anodes in common alignment however, leaves a ridge or bump in the roll which constitutes an open space and reduces the efficiency of the energy density of the capacitor volume.

In a preferred embodiment of the rolled capacitor of the present invention, it is been found that staggering the starting and ending edges of the plural anode layers improves the energy density of the capacitor. Staggering the starting edges of the roll, generally is the preferred manufacturing method and generally it has been found that such is effective in enabling an increase in energy density. Staggering the ending edges of the roll creates a significant increase in energy density and involves no significant manufacturing difficulties. In a most preferred embodiment of the invention, the anodes are staggered to end spaced around the circumference of the capacitor, with the cathode of sufficient length to overlap all the anodes.

FIGS. 1–3 illustrate relative lengths of anode foils and the positioning of the various terminal strips, in an embodiment of a three anode foil arrangement of the invention comprising staggered starting and ending edge arrangement. In the illustrated arrangement, FIG. 1 depicts the innermost anode, FIG. 2 the middle anode and FIG. 3 the outermost anode of the layered arrangement. Therein, the distance $d_1$ represents the length of the innermost anode layer from its starting edge to the attachment section of its terminal strip; the distance $d_2$ represents the length of the middle anode layer from its starting edge to the attachment section of its terminal strip; and the distance $d_3$ represents the length of the outermost anode layer from its starting edge to the attachment section of its terminal strip.

In the illustrated arrangement, the terminal strips are shown as being in preferred generally equal width, and arranged to be rolled to a close side-by-side proximity in the assembled capacitor. It should be understood however, that the terminal strips are not required to be of equal width nor is it required that they be arranged for the close side-by-side proximity depicted.

Thus, in the illustrated embodiment, the distance $d_2$ is the length to that point on anode 12 which in the rolled assembly is adjacent attaching strip 21a, less at least the width of attaching strip 22a; while the distance $d_3$ is the length to that point on anode 13 which in the rolled assembly is adjacent attaching strip 22a, less at least the width of attaching strip 23a. The distances $d_4$, $d_5$ and $d_6$ represent distances of anode ending edge underlap, common alignment or overlap. Again, the distance $d_4$ of anode 11 generally constitutes a selected defining length which establishes the diameter of the capacitor roll and a base distance from which the length of the distances $d_5$ and $d_6$ are determined. Generally anode overlap arrangements are preferred, with anode underlap arrangements being most preferred.

As should be apparent from FIGS. 1–3, upon winding the three anodes into position in the capacitor, the attaching sections are positioned circumferentially offset to each other, avoiding stacking of the attachment sections, while the projecting tabs form a radially stacked confluence for efficient formation of an anode terminal end for the capacitor. The advantage of this unique design is that it enables more anode material to be placed in the capacitor, thereby increasing the capacitance per unit volume.

FIG. 4, illustrates an embodiment of the relative length and position of the terminal strip of the cathode the anodes of FIGS. 1–3. Therein, cathode terminal strip 24 is illustrated as offset with respect to the three anode terminal strips 21a, 22a, 23a. The cathode terminal strip includes an attaching section 24a and a remote section or projecting tab 24c. In other words, when the capacitor layers are rolled, the cathode attaching section 24a does not overlap an anode attaching section 21a, 22a, and 23a and all attaching sections are physically spaced along a circumference of the winding. The distance $d_7$ is generally much greater than $d_4$, $d_5$ and $d_6$ to enable efficient cathode overlap of the anode foils.

Once the anode and cathode attaching sections are affixed to the foil strips, one or more separator material layers are placed on each side of the cathode layer to separate it from the anode layers. The anode layers are not separated from one another by paper. In a preferred embodiment, the separator material is an electrolytic capacitor tissue paper, Type UC, having a thickness of 0.0005 inches, bone dry, preferably as manufactured by MH Dielectrics, Inc. of Holly Springs, Pa.

Figure 5:
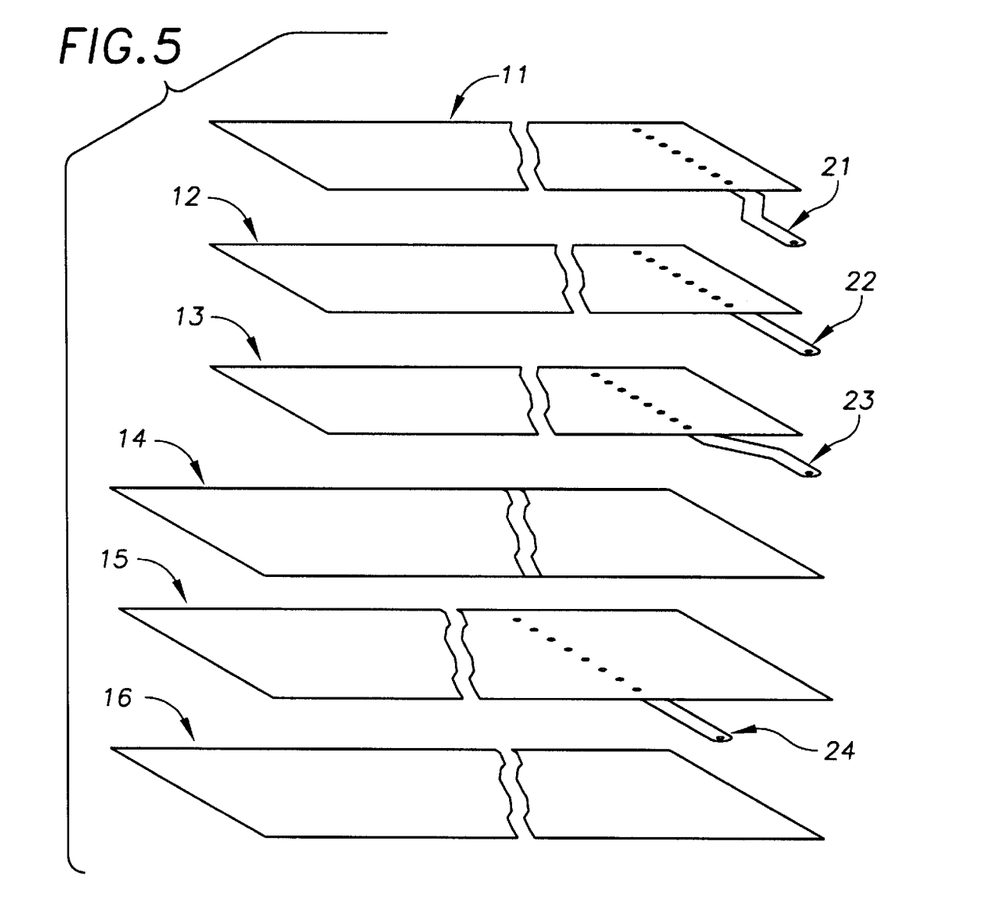
FIG. 5 is an exploded perspective view of anode and cathode layers of an embodiment of the invention prior to rolling, this view also illustrating dielectric paper separator layers.

FIG. 5 illustrates in exploded perspective view how the respective layers are arranged. Paper separator layers 15 and 16 are placed adjacent cathode layer 14 to prevent contact between the cathode and the anode layers. In a preferred embodiment shown in FIG. 7, two layers of kraft capacitor tissue paper is used. When a single layer of tissue paper is used, a fault anywhere in the paper may allow a short-circuit in the capacitor. In a two layer embodiment, it is extremely unlikely that a fault would occur at exactly the same location in both paper layers. Of course, a single layer of paper could be used with an attendant higher risk of failure due to a fault in the insulating paper. FIG. 5 clearly illustrates that the cathode layer and the paper layers are all longer than the anode layers.

Figure 6:
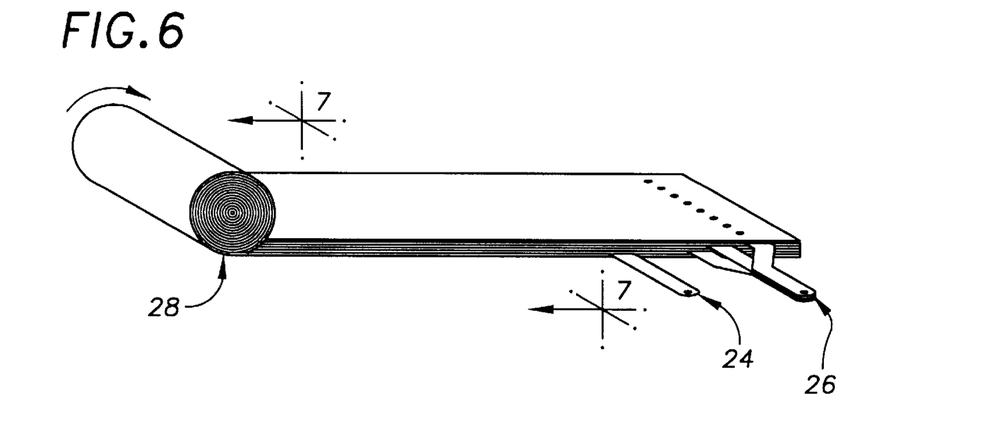
FIG. 6 is a perspective view of the capacitor as the layers, shown in FIG. 5, are being rolled.

Once the layers are in position, they are wound about a mandrel into a roll 28 as shown in FIG. 6. The mandrel is of a small diameter, but of a diameter great enough to prevent the foils from being damaged during winding. The three anode sections 21c, 22c and 23c overlap one another to form a common tab 26 which is illustrated in FIG. 6 as physically separated from cathode tab 24.

A single and double paper layer arrangements are illustrated in fragmentary cross-sectional view in FIGS. 8 and 7, respectively. FIG. 7 is taken generally along about plane 7—7 of FIG. 6, while FIG. 8 is a view similar to that of FIG. 7, but with a single paper layer substituted for the double paper layer. FIG. 7 clearly shows anode foil layer 31 adjacent anode foil layer 32, which in turn, is adjacent anode foil layer 33, which in turn, is adjacent paper separation layer 15, which in turn, is adjacent cathode foil layer 34, which in turn, is adjacent paper separation layer 16. When wound, paper layer 16 would contact and be adjacent to anode foil layer 31, separating the cathode from the anode. In FIG. 8, the double paper layer 15a, 15b is shown replaced by single paper layer 15, and double paper layer 16a, 16b is shown replaced by single paper layer 16.

Figure 9:
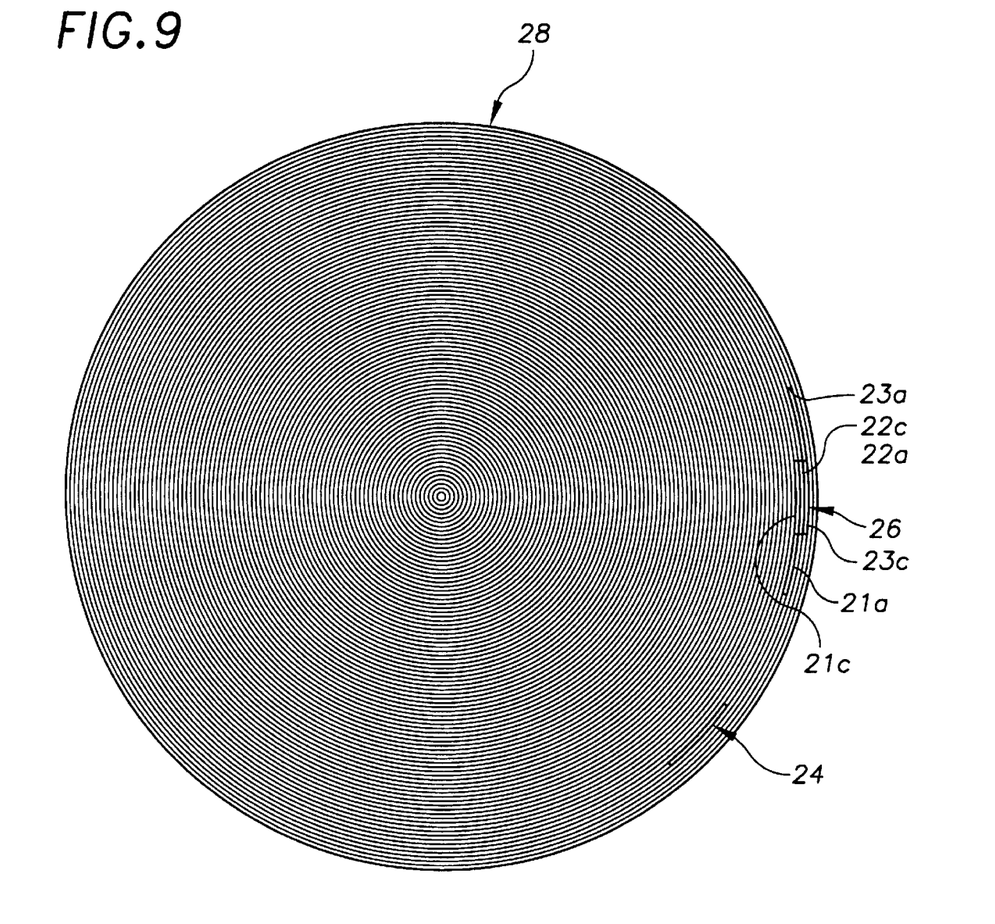
FIG. 9 is a top view of the rolled layers of the capacitor after placement in a cylindrical can housing.

The fully wound capacitor layers are shown in a top view in FIG. 9, which shows how the individual anode attaching sections 21a, 22a and 23a are offset from one another and from the cathode attaching section 24. The drawing also shows how anode tab sections 21c, 22c and 23c align to form anode tab 26.

Figure 10:
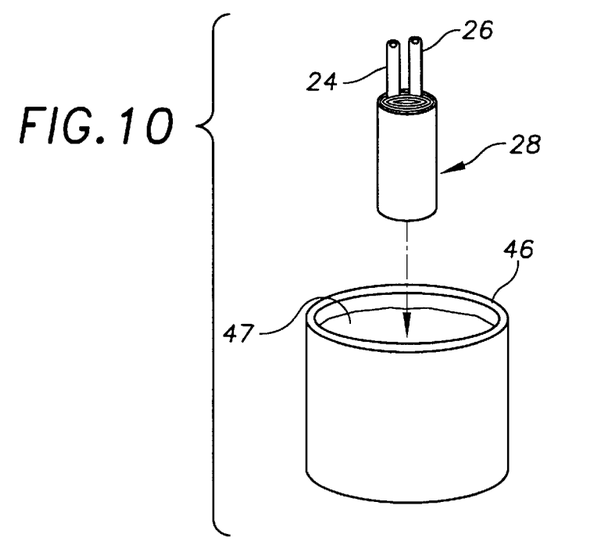
FIG. 10 illustrates a step in manufacture of a capacitor, namely immersion of the rolled layers in an electrolyte bath.

Once the capacitor layers are wound, the wound capacitor body 28 is impregnated with a suitable electrolyte. This process is illustrated schematically in FIG. 10, where the wound capacitor body 28 is shown being dipped in electrolyte bath 47 in container 46. Various electrolytes are suitable and well known in the art. For example, an ethylene glycol base with dicarboxylic acid concentration of between about 3 and about 20%, adjusted to a pH of approximately 7.0 and resistivity of about 300–1000 ohms per cm., depending upon the ultimate voltage requirement, being appropriate.

Figure 11:
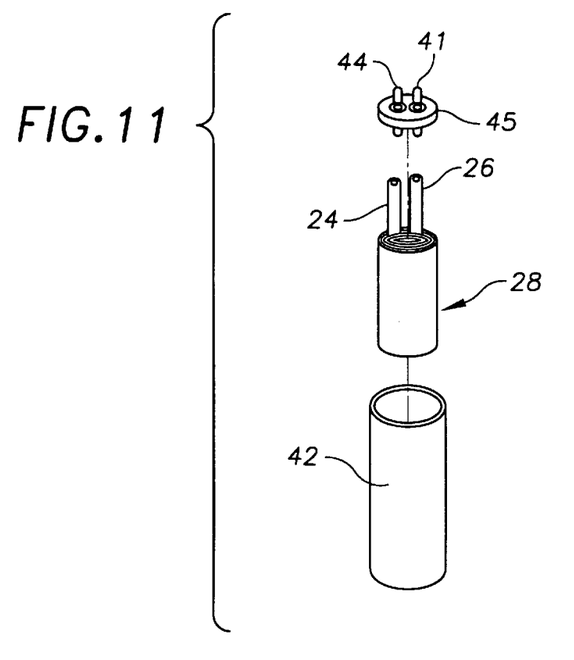
FIG. 11 is an exploded perspective assembly view of a capacitor of the invention.

Once impregnated with electrolyte, the wound capacitor body 28 is placed in housing 42 as shown in FIG. 11. The housing is preferably an aluminum cylinder having a closed bottom and open top. It should be understood, the housing may be made of other materials and take on other shapes. Tabs 24 and 26 are connected to terminals or studs 44 and 41 by any appropriate means, such as by welding or soldering. Terminals 44 and 41 are rigidly secured to header or terminal plate 45. The final assembly and manufacturing step is to crimp the canister as shown at 48 in FIG. 12.

While the best known modes of this invention have been shown herein, applicant does not intend to be limited to the particular details described and illustrated and it is understood the embodiments and details can be altered by one skilled in the art.

What is claimed is:

1. A multiple anode high energy density electrolytic capacitor comprising:
    a cylindrical housing having a primary anode terminal and a primary cathode terminal;
    a first paper separator layer comprising a strip of electrolytic tissue paper;
    a cathode layer comprising a strip of aluminum foil, said cathode layer located adjacent said first paper separator layer and having a cathode terminal strip affixed transversely to said cathode foil strip;
    a second paper separator layer comprising a strip of electrolytic capacitor tissue paper, said second paper separator layer located adjacent said cathode layer;
    a first anode layer comprising a strip of aluminum foil, said first anode layer located adjacent said second paper separator layer and having a first anode terminal strip affixed transversely to said first anode foil strip;
    a second anode layer comprising a strip of aluminum foil, said second anode layer located adjacent said first anode layer and having a second anode terminal strip affixed transversely to said second anode foil strip, said second anode terminal strip is offset with respect to said first anode terminal strip; and,
    a third anode layer comprising a strip of aluminum foil, said third anode layer located adjacent said second anode layer and said first paper separator layer and having a third anode terminal strip affixed transversely to said third anode foil strip, said third anode terminal strip is offset with respect to both said first anode terminal strip and said second anode terminal strip;
    wherein said first paper separator layer, said cathode layer, said second paper separator layer, said first anode layer, said second anode layer, and said third anode layer are all in contact with an electrolyte and are rolled into a cylindrical shape within said housing and said cathode terminal strip is connected to said primary cathode terminal and said first anode terminal strip, said second anode terminal strip and said third anode terminal strip are all connected to said primary anode terminal.

2. The multiple anode high energy density capacitor as recited in claim 1 wherein said first anode foil and said third anode foil are porous.

3. The multiple anode high energy density capacitor as recited in claim 2 wherein said second anode foil is non-porous.

4. The multiple anode high energy density capacitor as recited in claim 1 wherein said first, second and third anode foils are porous.

5. A high energy density electrolytic capacitor comprising:
    a cylindrical housing dimensioned for retaining a rolled laminate containing a cathode layer, an anode layer and separator layers;
    a primary anode terminal and a primary cathode terminal;
    said cathode layer, comprising an elongate strip of aluminum foil and having a primary cathode terminal strip affixed transversely to the foil strip; said anode layer, comprising three elongate strips of roughened porous aluminum foil arranged in adjacent layers, each strip of porous aluminum foil having a primary anode terminal strip affixed transversely thereto, said anode layer arranged adjacent said cathode layer and being separated from said cathode layer by said separator layers;
    a separator layer comprising an elongate strip of electrolytic capacitor separator material arranged adjacent to and between said cathode layer and said anode layer; each of said cathode layer, separator layers and anode layer being in contact with an electrolyte and rolled into said cylindrical housing, said cathode terminal strip being connected to said primary cathode terminal and said anode terminal strips being connected to said primary anode terminal;
    wherein each of said three elongate porous aluminum foil strips comprising said anode layer has a minimum porosity, measured by air flow, of about 0.5 cc/sec-cm$^2$-atm, and a foil surface area, measured by capacitance, of at least about 0.2 $\mu$F per square centimeter.

6. A capacitor of claim 6 wherein a separator layer comprises two layers of separator material.

7. A capacitor of claim 7 wherein said capacitor separator material comprises a kraft tissue paper.

8. A capacitor of claim 6 wherein said roughened porous aluminum foil of said anode layer has a capacitance of at least about 0.4 $\mu$F per square centimeter and said cathode layer has a capacitance of from about 5 to about 30 $\mu$F per square centimeter.

9. A high energy density layered electrolytic capacitor comprising:
    at least two anode layers having terminals offset with respect to one another;
    a cathode layer having a terminal;
    at least two electrolytic separator layers separating said anode layers from said cathode layer;
    a housing containing said at least two anode layers, said cathode layer, and said at least two separator layers; and, an electrolyte contained within said housing.

* * * * *

UNITED STATES PATENT AND TRADEMARK OFFICE
CERTIFICATE OF CORRECTION

PATENT NO. : 5,963,418
DATED : Oct 5, 1999
INVENTOR(S) : John M. Greenwood, Jr; Van Ness Harwood, Jr.; Oakland J. Weatherup It is certified that error appears in the above-identified patent and that said Letters Patent is hereby corrected as shown below:

Column 8, line 47, change "of claim 6" to --- of claim 5 ---

Column 8, line 49, change "of claim 7" to --- of claim 6 ---

Column 8, line 51, change "of claim 6" to --- of claim 5 ---

Signed and Sealed this

Seventh Day of March, 2000

*Attest:*

*Attesting Officer*

Q. TODD DICKINSON

*Commissioner of Patents and Trademarks*